US007938289B2

(12) United States Patent
Nakajima et al.

(10) Patent No.: US 7,938,289 B2
(45) Date of Patent: May 10, 2011

(54) THERMAL INSULATING CONTAINER FOR A HEAT GENERATING UNIT OF A FUEL CELL SYSTEM

(75) Inventors: Yasushi Nakajima, Kawasaki (JP); Keiko Kushibiki, Fujisawa (JP); Shigeo Ibuka, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 905 days.

(21) Appl. No.: 11/667,356

(22) PCT Filed: Nov. 2, 2005

(86) PCT No.: PCT/JP2005/020487

§ 371 (c)(1), (2), (4) Date: May 9, 2007

(87) PCT Pub. No.: WO2006/057158

PCT Pub. Date: Jun. 1, 2006

(65) Prior Publication Data

US 2007/0295734 A1 Dec. 27, 2007

(30) Foreign Application Priority Data

Nov. 26, 2004 (JP) ................................ 2004-342263

(51) Int. Cl.
*B65D 81/38* (2006.01)

(52) U.S. Cl. .................................................. 220/592.26

(58) Field of Classification Search ............. 220/592.26, 220/592.21, 62.17, 62.18, 62.15, FOR. 137, 220/FOR. 136, FOR. 132, FOR. 162, FOR. 181; 215/13.1; 60/781, 780, 772, 39.01
See application file for complete search history.

(56) References Cited

U.S. PATENT DOCUMENTS 3,108,706 A * 10/1963 Matsch et al. ........... 220/592.11
3,114,469 A * 12/1963 Francis et al. ........... 220/592.27
3,133,422 A * 5/1964 Paivanas et al. ............... 62/48.3
3,139,206 A * 6/1964 Matsch .................... 220/592.27

(Continued)

FOREIGN PATENT DOCUMENTS

CH 637755 A * 8/1983

(Continued)

OTHER PUBLICATIONS

Specification Translation of JP 2001-304495 (Fumiaki et al), Oct. 31, 2001, Paragraph 17 Lines 15-25, Paragraph 18 Lines 18-29, Paragraph 19 Lines 11-32, and Paragraph 26 Lines 1-21.*

*Primary Examiner* — Anthony Stashick
*Assistant Examiner* — Robert J Hicks
(74) *Attorney, Agent, or Firm* — Foley & Lardner LLP

(57) ABSTRACT

A thermal insulating container (1) of the present invention includes a container body (9) formed of an inner container shell (2) for housing a heat generation unit (H), and of an outer container shell (3) for covering the inner container shell (2), and a vacuum layer (4) located between the inner container shell (2) and the outer container shell (3). Further, the thermal insulating container (1) is characterized in that the heat generation unit-side surface of the inner container shell (2) is covered with a thermal insulator (5). In the thermal insulating container (1), the thermal insulator (5) is provided between the inner container shell (2) and the heat generation unit (5), and the temperature rise of the inner container shell (2) is gas permeation through the inner container shell (2) is restricted.

13 Claims, 4 Drawing Sheets

U.S. PATENT DOCUMENTS

| | | | | | |
|---|---|---|---|---|---|
| 3,274,788 | A | * | 9/1966 | Hoffman et al. | 62/45.1 |
| 3,514,006 | A | * | 5/1970 | Molnar | 220/560.13 |
| 3,698,588 | A | * | 10/1972 | Pogorski | 220/592.26 |
| 3,715,265 | A | * | 2/1973 | Allen et al. | 428/143 |
| 3,738,103 | A | * | 6/1973 | Rudolph et al. | 60/649 |
| 3,921,844 | A | * | 11/1975 | Walles | 215/13.1 |
| 4,154,364 | A | * | 5/1979 | Hagiwara et al. | 220/560.12 |
| 4,168,013 | A | * | 9/1979 | King et al. | 220/592.21 |
| 4,444,821 | A | * | 4/1984 | Young et al. | 428/69 |
| 4,517,445 | A | * | 5/1985 | Tatsumi et al. | 392/444 |
| 4,702,963 | A | * | 10/1987 | Phillips et al. | 428/426 |
| 4,856,174 | A | * | 8/1989 | Ishizaki et al. | 29/455.1 |
| 5,091,233 | A | * | 2/1992 | Kirby et al. | 428/69 |
| 5,399,408 | A | * | 3/1995 | Nowara | 428/73 |
| 6,221,456 | B1 | * | 4/2001 | Pogorski et al. | 428/69 |
| 6,371,328 | B1 | * | 4/2002 | Yamada et al. | 220/592.2 |
| 6,682,841 | B1 | | 1/2004 | Armstrong et al. | |
| 2003/0189054 | A1 | | 10/2003 | Watanabe et al. | |

FOREIGN PATENT DOCUMENTS

| | | | | |
|---|---|---|---|---|
| EP | 0 633 420 | A2 | | 1/1995 |
| EP | 1 037 296 | A1 | | 9/2000 |
| FR | 1 494 112 | | | 9/1967 |
| GB | 2176457 | A | * | 12/1986 |
| JP | 63-057020 | A | | 3/1988 |
| JP | 3-017428 | A | | 1/1991 |
| JP | 03-066997 | A | | 3/1991 |
| JP | 6-231951 | A | | 8/1994 |
| JP | 7-507490 | A | | 8/1995 |
| JP | 3-20349 | U | | 11/1995 |
| JP | 8-138721 | A | | 5/1996 |
| JP | 2000-252273 | A | | 9/2000 |
| JP | 2001-220684 | A | | 8/2001 |
| JP | 2001-304495 | A | | 10/2001 |
| JP | 2002-081595 | A | | 3/2002 |
| JP | 2003-075070 | A | | 3/2003 |

* cited by examiner

THERMAL INSULATING CONTAINER FOR A HEAT GENERATING UNIT OF A FUEL CELL SYSTEM

TECHNICAL FIELD

The present invention relates to a thermal insulating container suitable for use in mounting a fuel cell operating at high temperature on a mobile object, for example, on a vehicle.

BACKGROUND ART

Heretofore, a fuel cell operating at high temperature, for example, a phosphoric acid fuel cell and a molten carbonate fuel cell, have been premised to be equipped in a large-scale power plant or the like. Accordingly, downsizing of a facility for the purpose of thermal independence thereof by thermal insulation and heat shielding has not been considered. However, a study has been made of downsizing and temperature lowering thereof, pertaining to a solid oxide fuel cell. And, mounting of the solid oxide fuel cell on a mobile object has become a possibility.

Although the study has been made pertaining to temperature lowering of the solid oxide fuel cell, operation temperature thereof has actually reached 500° C. or more. Therefore, in order to mount the solid oxide fuel cell on the mobile object such as a vehicle, a thermal insulating container for shielding heat transfer from the fuel cell concerned to other instruments comes to be necessary. As the thermal insulating container, there exists such for use in an electric furnace or the like, that is, such in which the electric furnace is surrounded by a ceramic thermal insulator with a thickness of several ten centimeters, and a metal container is provided on the periphery thereof. However, when the fuel cell contained in such a conventional thermal insulating container is mounted on the mobile object, a volume involved in the thermal insulation is too large. Therefore, there has been proposed a method of housing the solid oxide fuel cell in a vacuum thermal insulating container made of stainless steel (refer to Japanese Patent Laid-Open Publication No. H08-138721 (published in 1996)).

DISCLOSURE OF INVENTION

However, in the above-described vacuum thermal insulating container, an inner wall thereof is heated by high-temperature radiated heat generated by the housed fuel cell. Therefore, the stainless steel container becomes thinned and fragile in a portion in contact with the atmosphere owing to oxidation. In addition, an amount of hydrogen permeation through the container material is increased at high temperatures, a degree of vacuum of the container is lowered, and thermal insulating performance thereof is prone to be lowered. In this case, the degree of vacuum in a vacuum layer can be maintained at a high level by adsorbing hydrogen by means of a gas getter provided in the vacuum layer. However, when the hydrogen permeation amount is increased, a hydrogen adsorption capability of the gas getter reaches a limit thereof, and so on, the degree of vacuum cannot be maintained at high levels. Therefore, in reality, it has been difficult to use the above-described vacuum thermal insulating container as a container for the fuel cell operating at the high temperature for a long period of time unless measures for reducing the hydrogen permeation amount are taken.

The present invention has been made focusing on the above-described conventional problem. It is an object of the present invention to provide a thermal insulating container, which excells in thermal insulation performance in the case of housing a fuel cell as a heat generation unit, and is capable of inhibiting occurrences of cracking of the fuel cell at cooling time when the fuel cell is one using a ceramic material, such as a solid oxide fuel cell.

According to one aspect of the present invention, there is provided a thermal insulating container comprising: a container body having a double wall structure comprising an inner container shell which houses a heat generation unit and an outer container shell which covers the inner container shell and being joined thereto, the container body having a vacuum layer provided between the inner container shell and the outer container shell; and a thermal insulator which is located between the heat generation unit and the inner container shell, and covers the heat generation unit-side surface of the inner container shell.

BEST MODE FOR CARRYING OUT THE INVENTION

Figure 1:
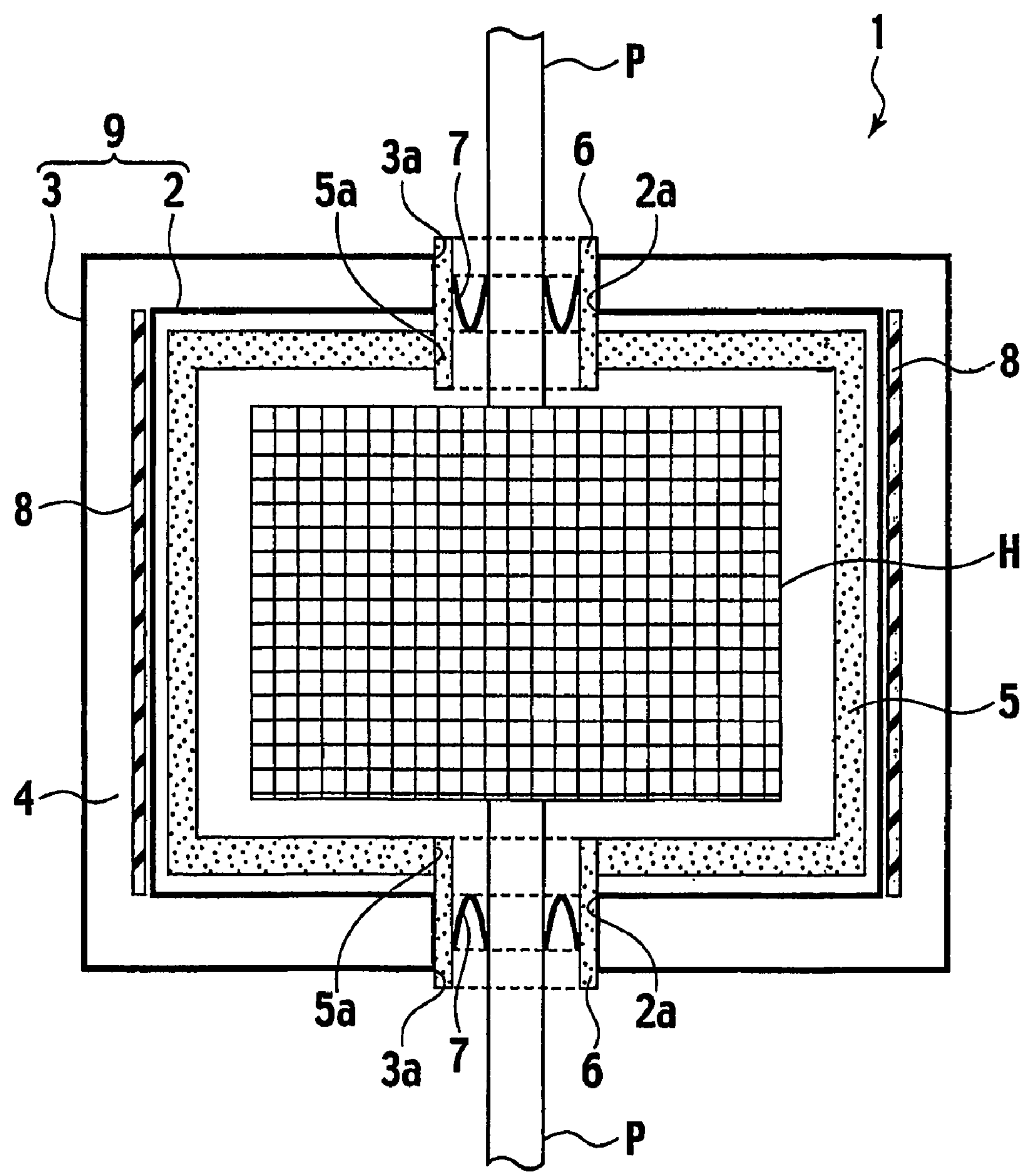
FIG. 1 is a cross-sectional view showing a thermal insulating container of a first embodiment.

Embodiments of the present invention will be explained below with reference to the drawings, wherein like numbers are designated by like reference characters.

First Embodiment

As shown in FIG. 1, a thermal insulating container of this embodiment includes an inner container shell 2 forming a box shape, and an outer container shell 3 forming a larger box shape than the inner container shell 2 and for covering the inner container shell 2. The inner container shell 2 and the outer container shell 3 are joined to each other at a predetermined gap, and a container body 9 having a double wall structure is thus formed. In the container body 9, a hermetically sealed space composed of the inner container shell 2 and the outer container shell 3 is formed, and a vacuum layer 4 is formed by degassing the hermetically sealed space.

In the inner container shell 2, a reformer is housed as a high-temperature heat generation unit H. This reformer reforms hydrocarbon gas by steam reforming and so on, thereby generating hydrogen. Moreover, between the inner container shell 2 and the heat generation unit H, a thermal insulator 5 is provided so as to cover the heat generation unit H. The thermal insulator 5 restricts a temperature rise of the inner container shell 2 owing to thermal conduction and radiation from the high-temperature heat generation unit H, and porous ceramics with a thickness of approximately 5 mm can be used therefor. Moreover, the thermal insulator 5 is adhered and fixed to an inner surface of the inner container shell 2.

An opening 2_a_ is provided in the respective upper surfaces of the inner container shell 2 and the outer container shell 3, and an opening 3*a* is provided in the respective lower surfaces thereof. A pipe P (pipe body) penetrates the openings 2*a* and 3*a*. The pipe P is connected to the heat generation unit H, and the heat generation unit H is supported by the pipe P in the inside of the inner container shell 2. The reformer as the heat generation unit H captures the hydrocarbon gas through the pipe P, reforms the hydrocarbon gas, and exhausts gas thus reformed.

Moreover, ceramic rings 6 (thermal insulating cylinders 6), being connected to peripheral edge portions of openings 5*a* provided in the thermal insulator 5, are fitted to the respective openings 2*a* and 3*a* of the inner container shell 2 and the outer container shell 3. The ceramic rings 6 are made of ceramics, and accordingly, have electrical insulating properties besides thermal insulating properties. Furthermore, the pipe P is fixed to the thermal insulating cylinders 6 through bent spring-plate rings 7 (heat resistant members 7) having heat resistance. The spring-plate rings 7 are constructed to strongly fix the pipe P to the ceramic rings 6 while reducing the thermal conduction to the inner container shell 2 and the outer container shell 3 at high temperature by restricting a contact area of the pipe P with the ceramic rings 6 to be small. Meanwhile, the ceramic rings 6 have the electrical insulating property as well as can reduce the thermal conduction, and accordingly, does not cause a short circuit even if the heat generation unit is a solid oxide fuel cell.

Figure 2:
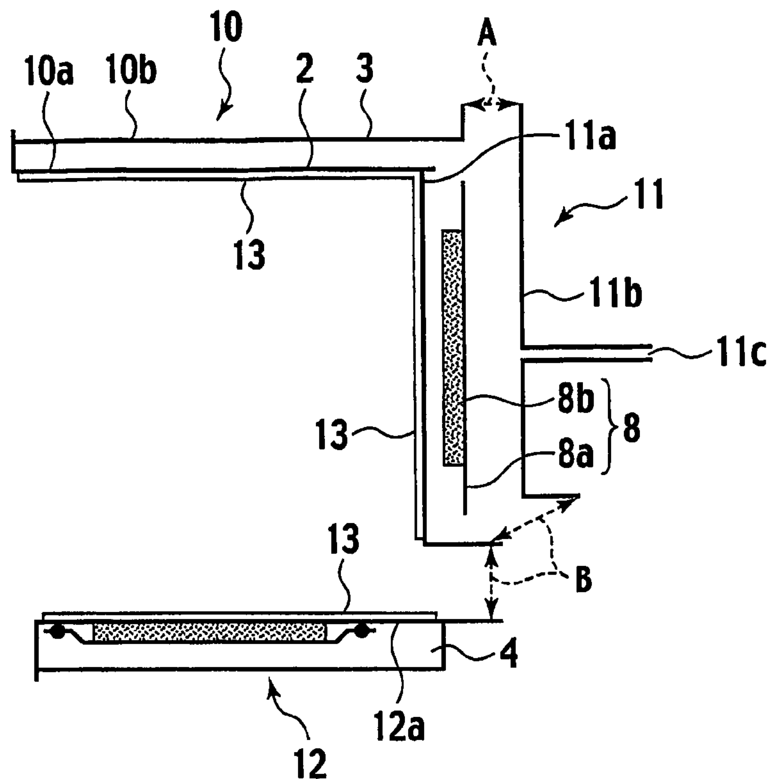
FIGS. 2 and 3 are schematic cross-sectional views for explaining an assembling procedure of the thermal insulating container of the first embodiment.

The thermal insulating container 1 includes a gas getter member 8 in the vacuum layer 4 between the inner container shell 2 and the outer container shell 3. The gas getter member 8 adsorbs gas remaining in the vacuum layer 4 by a physical or chemical function, and improves a degree of vacuum of the vacuum layer 4. As shown in FIG. 2, the gas getter member 8 is formed by supporting a non-evaporable gas getter 8*b* on one surface of metal foil 8*a*. In the vacuum layer 4, the gas getter member 8 is fixed to the inner container shell 2 while bringing the surface having the non-evaporable gas getter 8*b* supported thereon into intimate contact with the inner container shell 2.

In the thermal insulating container 1 of this embodiment, the vacuum layer 4 is provided between the inner container shell 2 and the outer container shell 3, and in addition, the heat generation unit H-side surface of the inner container shell 2 is covered with the thermal insulator 5. Therefore, movement of the gas from the heat generation unit H to the inner container shell 2 is restricted by providing the thermal insulator 5. Moreover, the temperature rise of the inner container shell 2 is also restricted by the thermal insulator 5, and accordingly, permeation of the gas from the inner container shell 2 to the vacuum layer 4 is restricted, thus making it easy to maintain the degree of vacuum in the vacuum layer 4 at a high level. Specifically, vacuum thermal insulation is enabled, and the thermal insulating property is thus improved dramatically. Here, not only the porous ceramics but also glass can be used as the thermal insulator 5. In the case of using the porous ceramics as the thermal insulator, it is easy to maintain such a thermal insulating structure because the ceramics have high heat resistance. Meanwhile, in the case of using the glass as the thermal insulator, a gas permeation amount therethrough at the time of the temperature rise is smaller than that of a metal material, and accordingly, it is easy to maintain the degree of vacuum in the vacuum layer 4 at a high level.

Moreover, in the thermal insulating container 1 of this embodiment, the gas getter member 8 is provided in the vacuum layer 4, and further, the gas getter member 8 is fixed to the inner container shell 2 while bringing the surface having the non-evaporable gas getter 8*b* attached thereupon into intimate contact with the inner container shell 2. Therefore, even if the inner container shell 2 is heated up, and the gas permeation from the heat generation unit H to the vacuum layer 4 is increased accompanied with the temperature rise, the degree of vacuum in the vacuum layer 4 can be easily maintained at a high level since adsorption performance of the gas getter member 8 is also improved accompanied with the temperature rise. Furthermore, the surface having the gas getter of the gas getter member 8 attached thereupon is brought into intimate contact with the inner container shell 2 which the gas permeates, and accordingly, the permeating gas is adsorbed efficiently. Moreover, in the metal foil 8*a* of the gas getter member 8, a surface not having the gas getter attached thereupon can be finished into a mirror surface. In this case, infrared radiation from the metal foil 8*a* is reduced, and the outer container shell 3 becomes less prone to taking on heat. Therefore, since gas permeation through the outer container shell 3 is restricted, the degree of vacuum in the vacuum layer 4 is maintained at the high level, thus making it possible to avoid lowering of the thermal insulating performance.

Next, description is made of a manufacturing procedure of the thermal insulating container 1 of this embodiment. Here, as shown in FIG. 2, description is made of a procedure of assembling three parts which are a top portion 10, a body portion 11, and a bottom portion 12 of the inner container shell 2 and the outer container shell 3. Note that, for the bottom portion 12, a completed state where the vacuum layer 4 has already been formed in the inside thereof is shown, and a manufacturing procedure thereof conforms to a manufacturing procedure of the body portion 11, which is to be described below.

It is anticipated that the inner container shell 2 made of ferrite stainless steel is oxidized little by little by heat of the heat generation unit H when being brought into contact with the air. Moreover, as for usual stainless steel, it is difficult to obtain a surface form thereof with a uniform gloss owing to soil and the like of a surface thereof. Accordingly, in the thermal insulating container 1, it is preferable to provide a protection layer 13 for preventing oxidation of the inner container shell 2 on a surface of the inner container shell 2, which is opposite to the thermal insulator 5, after individually cleaning up the top portion 10, the body portion 11, and the bottom portion 12. Specifically, it is preferable to provide the protection layer 13 on regions anticipated to be oxidized on inner side surfaces of parts 10*a*, 11*a* and 12*a* of the top portion 10, the body portion 11, and the bottom portion 12, which construct the inner container shell 2. One made of chromium oxide (chromia) can be provided as the protection layer 13. When the protection layer 13 is made of chromia, the protection layer 13 can be provided by a method such as selective oxidation. The protection layer 13 allows only a small amount of gas to permeate, and is advantageous from a viewpoint of improvement of chemical stability of the surface of the inner container shell 2; however, the protection layer 13 is not an essential one.

Figure 3:
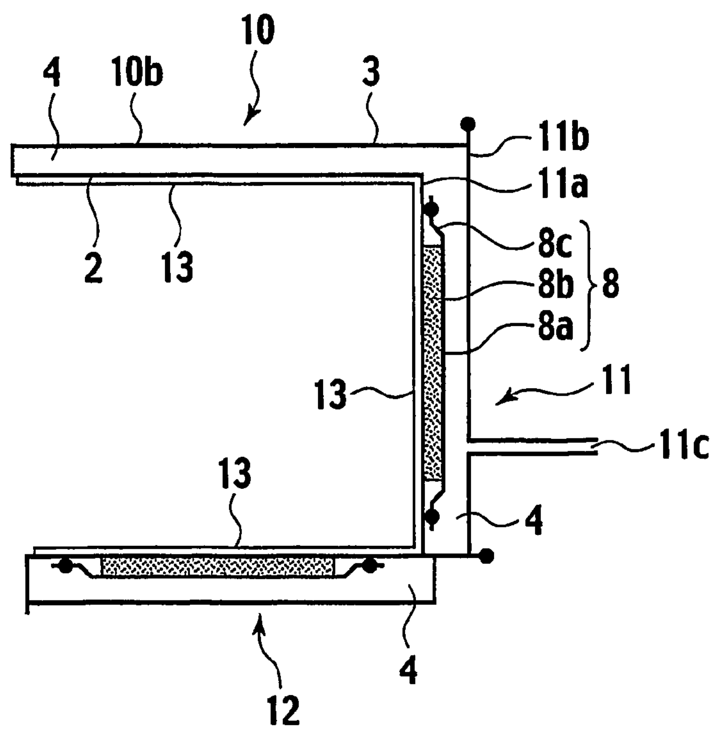

Subsequently, the gas getter member 8 is fitted onto the vacuum layer 4-side surface of the part 11*a* of the body portion 11. As the gas getter member 8, usable is one formed by supporting the non-evaporable gas getter 8*b* on one surface of the metal foil 8*a* made of nickel and the like. For example, ST122 made by SAES Gas getters S.p.A. in Italy is usable. In this case, as shown in FIG. 3, the surface of the gas getter member 8, which has the non-evaporable gas getter 8*b* supported thereon, is brought into intimate contact with the vacuum layer 4-side surface of the part 11*a*, and a foil portion 8*c* is fixed to the part 11*a* by welding such as spot welding.

In usual, the gas getter member is disposed so that the surface onto which the gas getter is attached can be exposed to the surface (outside). However, in this embodiment, the gas getter is brought into intimate contact with the vacuum layer 4-side surface of the inner container shell 2, and accordingly, when the gas permeates the inner container shell 2, the permeating gas is adsorbed instantaneously by the gas getter.

Then, the parts 10*b* and 11*b* of the top portion 10 and the body portion 11, which construct the outer container shell 3, are joined to each other by welding, and the top portion 10 and the body portion 11 are thus assembled together. Subsequently, the respective joint portions of the top portion 10, the body portion 11, and the bottom portion 12 are joined together by welding. Specifically, in FIG. 2, a portion of reference symbol A is welded by laser or the like, and the top portion 10 and the body portion 11 are thus joined to each other, and thereafter, a portion of reference symbol B is welded. In such a way, the top portion 10, the body portion 11, and the bottom portion 12 are adhered together.

Thereafter, matter occupying the space composed of the inner container shell 2 and the outer container shell 3 is exhausted from an exhaust port 11*c* of the body portion 11, and is hermetically sealed, and the vacuum layer 4 is thus formed. The gas getter member 8 is activated in advance by baking during the exhaust or by baking after the hermetic sealing. Note that, since the vacuum layer 4-side surface of the inner container shell 2 is always heated to some extent by the operation of the heat generation unit H, it is not necessary that such activation be perfect. Moreover, at the point of time when the respective joint portions of the top portion 10, the body portion 11, and the bottom portion 12 are welded by the laser or the like as described above, the attachment of the thermal insulating layer 5 onto the inner container shell 2 and the housing of the heat generation unit H in the inner container shell 2 are completed.

Second Embodiment

A thermal insulating container of a second embodiment is described below. In the specification and the drawings, which are to be described below, the same reference numerals are assigned to members having the same functions as those described in the first embodiment, and repeated description thereof is omitted.

Figure 4:
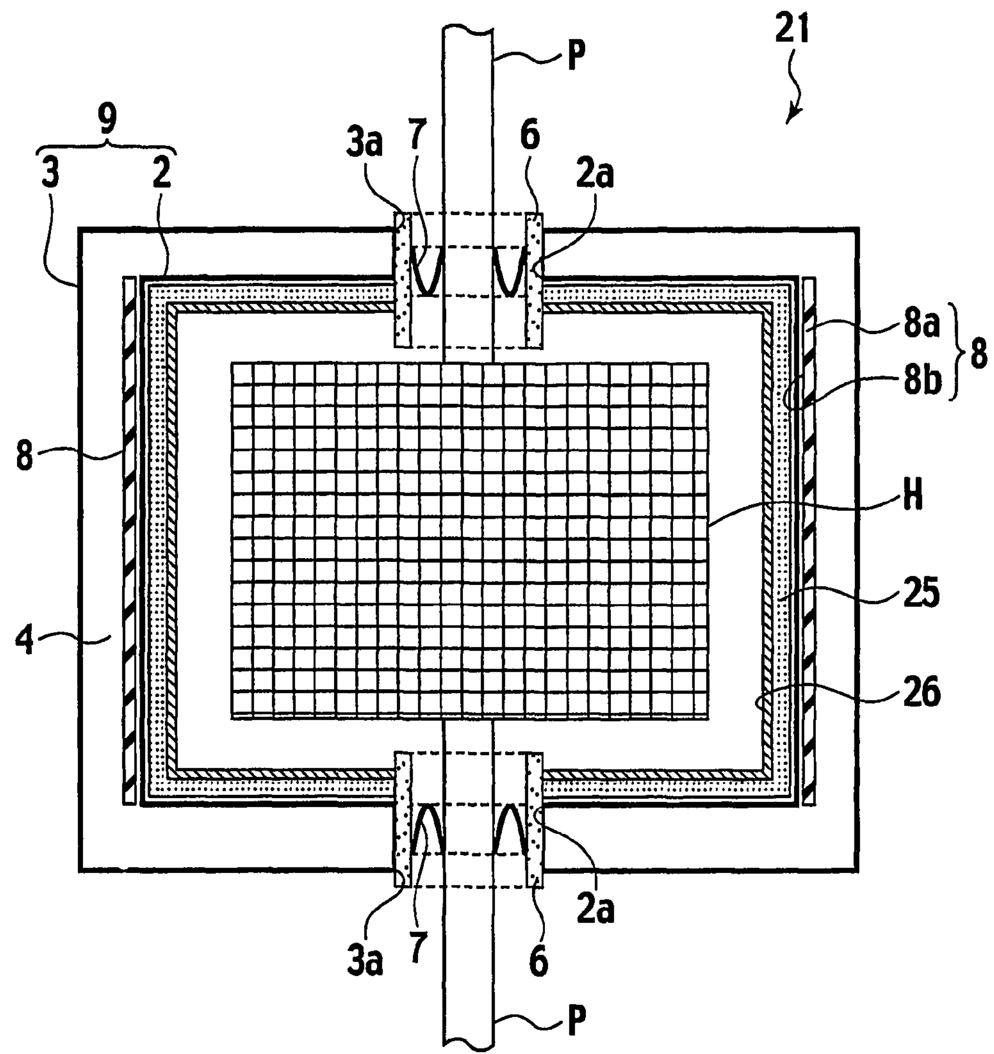
FIG. 4 is a cross-sectional view showing a thermal insulating container of a second embodiment.

FIG. 4 shows the thermal insulating container of this embodiment. The thermal insulating container 21 of this embodiment differs from the thermal insulating container 1 of the first embodiment in that a coating layer 25 in which a gas permeation rate is low is provided on the heat generation unit H-side surface of the inner container shell 2, the coating layer 25 is finished into a mirror surface, and an infrared reflecting layer 26 is formed on the mirror surface. Other constructions are the same as those of the thermal insulating container 1 in the first embodiment.

The coating layer 25 has a role as a thermal insulator. Moreover, glass through which gas permeability is low can be used as the coating layer 25. Gold can be used as the infrared reflecting layer 26. Specifically, after the coating layer 25 is finished into the mirror surface, the gold is evaporated thereon with a thickness of approximately 500 nm, thus the reflecting layer 26 can be formed. The gold for use in forming the infrared reflecting layer 26 is particularly excellent in reflective power of an infrared ray from the heat generation unit H. Specifically, the infrared ray from the heat generation unit H is reflected by providing the infrared reflecting layer 26, and further, the glass is used as the coating layer 25, thus the thermal insulating performance can be ensured. As a result, since the temperature rise of the inner container shell 2 is prevented, the gas permeation through the inner container shell 2 is restricted, thus the degree of vacuum of the vacuum layer 4 can be maintained at a high level.

Figure 5:
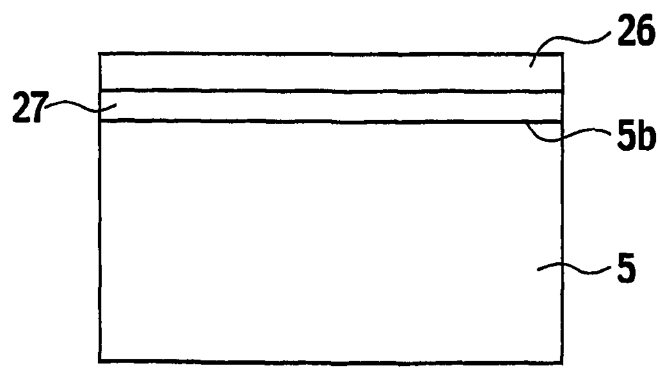
FIG. 5 is a cross-sectional view showing another example of a thermal insulating layer in the thermal insulating container of the second embodiment.

Note that, as shown in FIG. 5, a construction may be adopted, in which, in the thermal insulating container 1 of the first embodiment, a surface 5*b* made of the porous ceramics used as the thermal insulator 5 is finished into a mirror surface, and an adhesion layer 27 made of nickel and the like is formed on the thermal insulator 5 finished into the mirror surface, followed by evaporation of the gold on the adhesion layer 27, thereby providing the infrared reflecting layer 26.

Third Embodiment

A thermal insulating container of a third embodiment is described below. In the specification and the drawings, which are to be described below, the same reference numerals are assigned to members having the same functions as those described in the first embodiment and the second embodiment, and repeated description thereof is omitted.

Figure 6:
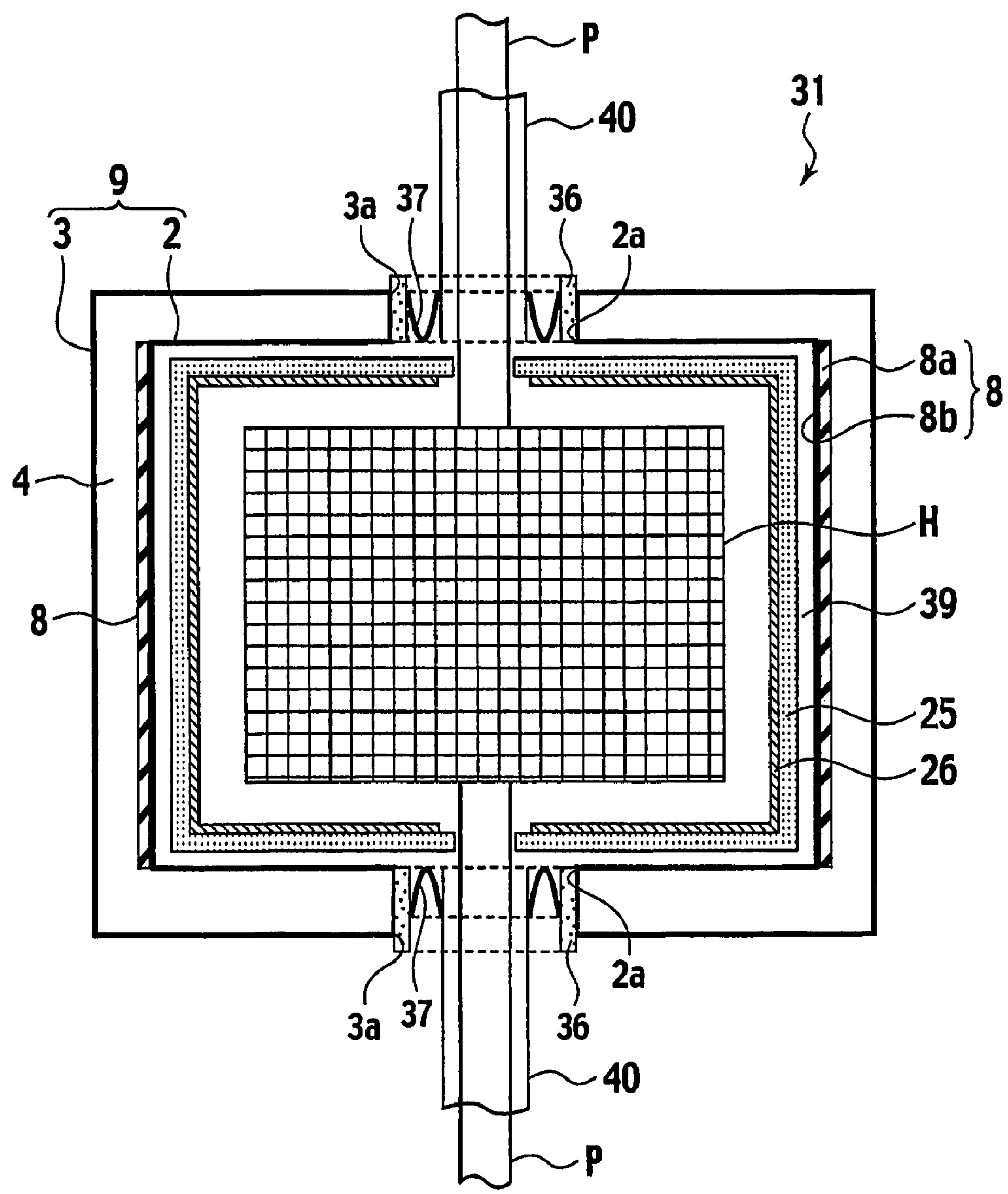
FIG. 6 is a cross-sectional view showing a thermal insulating container of a third embodiment.

FIG. 6 shows a thermal insulating container of this embodiment. The thermal insulating container 31 of this embodiment differs from the thermal insulating container 21 of the second embodiment in that a gas flow passage 39 is provided between the heat generation unit H-side surface of the inner container shell 2 and the coating layer 25. Cooling gas, which is lower in temperature than the heat generation unit H, is made to flow through the gas flow passage 39.

Specifically, there are provided ceramic rings (thermal insulating cylinders) 36 having electrical insulating property, which are fitted to both of the openings 2*a* and 3*a* provided in the inner container shell 2 and the outer container shell 3, respectively. Then, a cooling gas supply pipe 40 for supplying the cooling gas to the gas flow passage 39 is fixed to the ceramic rings 36 through spring-plate rings (heat resistant members) 37. Moreover, the pipe P for supplying/exhausting the gas to/from the heat generation unit H is disposed in the cooling gas supply pipe 40 coaxially therewith.

In the thermal insulating container 31, when the cooling gas, being lower in temperature than the heat generation unit H, is supplied to the gas flow passage 39 through the cooling gas supply pipe 40, the heat generation unit H-side surface of the inner container shell 2 can be cooled. As a result, the temperature of the heat generation unit H-side surface of the inner container shell 2 is lowered, making it possible to prevent the permeation and oxidation of the gas.

Moreover, in the above-described thermal insulating container 31, the pipe P for supplying/exhausting the gas to/from the heat generation unit H is disposed in the cooling gas supply pipe 40 coaxially therewith. Accordingly, the cooling gas flowing through the cooling gas supply pipe 40 not only, restricts thermal conduction from the high-temperature pipe P to the inner container shell 2 and the outer container shell 3, but thermal conduction of a contact area of the high-temperature pipe P and the inner container shell 2 can also be restricted and reduced. Therefore, the thermal insulating performance is less prone to be lowered.

In this case, when a solid oxide fuel cell which entirely forms a cylindrical shape and has a fuel gas flow passage and an air flow passage arranged on an axis center thereof is the heat generation unit H, the gas supplied/exhausted through the pipe P is set to be fuel gas, and the cooling gas supplied/exhausted through the cooling gas supply pipe 40 is set to be the air, the gas supply for the cooling can also serve as the gas supply for the power generation. In such a way, simplification of the system can be realized, and in addition, operational safety thereof is improved.

The entire content of a Japanese Patent Application No. P2004-342263 with a filing date of Nov. 26, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

The thermal insulating container of the present invention includes the container body formed of the inner container shell for housing the heat generation unit, and of the outer container shell for covering the inner container shell, and the vacuum layer located between the inner container shell and the outer container shell, and is characterized in that the heat generation unit-side surface of the inner container shell is covered with the thermal insulator. In the thermal insulating container, the thermal insulator is provided between the inner container shell and the heat generation unit, and the temperature rise of the inner container shell is thus restricted. As a result, the gas permeation through the inner container shell is restricted. Specifically, it is made easy to maintain the degree of vacuum in the vacuum layer at the high level, and accordingly, the thermal insulating property of the container is improved.

Moreover, the thermal insulating container of the present invention can realize downsizing of the entire apparatus even in the case of housing the fuel cell as the heat generation unit. Furthermore, in the thermal insulating container of the present invention, the thermal insulator made of ceramics and the like is provided, and accordingly, an extreme lowering of temperature in the inside of the container is less prone to occur after the operation of the heat generation unit is stopped. Therefore, even in the case where the heat generation unit is the fuel cell using the ceramic material, such as the solid oxide fuel cell, an occurrence of a crack in the ceramic material owing to the extreme lowering of temperature can be restricted.

The invention claimed is:

1. A thermal insulating container, comprising:

a container body having a double wall structure comprising:

an inner container shell which houses a heat generation unit; and an outer container shell which covers the inner container shell and is joined thereto, the container body having a vacuum layer provided between the inner container shell and the outer container shell;

wherein the heat generation unit is a solid oxide fuel cell or a reformer reforming hydrocarbon gas into hydrogen by steam reforming; and a thermal insulator which is located between the heat generation unit and the inner container shell, and covers a heat generation unit side surface of the inner container shell.

2. A thermal insulating container according to claim 1, wherein the thermal insulator is formed of porous ceramics or glass.

3. A thermal insulating container according to claim 1, wherein a heat generation unit side surface of the thermal insulator is finished into a mirror surface, and an infrared reflecting layer is provided on the mirror surface.

4. A thermal insulating container according to claim 3, wherein the infrared reflecting layer is made of gold.

5. A thermal insulating container according to claim 3, further comprising: an adhesion layer provided between the thermal insulator and the infrared reflecting layer.

6. A thermal insulating container according to claim 1, further comprising: a gas getter member provided in the vacuum layer.

7. A thermal insulating container according to claim 6, wherein the gas getter member is formed by supporting a non-evaporable gas getter on one surface of metal foil, and the gas getter member is fixed to the inner container shell while bringing the gas getter into intimate contact therewith.

8. A thermal insulating container according to claim 1, further comprising: a gas flow passage which is provided between the inner container shell and the thermal insulator, and flows gas lower in temperature than the heat generation unit therethrough.

9. A thermal insulating container according to claim 1, further comprising:

a pipe body which supports the heat generation unit in the container body, wherein a first opening is provided in respective upper surfaces of the inner container shell and the outer container shell, and a second opening is provided in respective lower surfaces thereof, and wherein the pipe body penetrates both of the first and second openings.

10. A thermal insulating container according to claim 9, further comprising:

a thermal insulating cylinder having electrical insulating property, the thermal insulating cylinder being fitted to the first or second opening, and connected to a peripheral edge of a third opening provided in the thermal insulator, wherein the pipe body is fixed to the thermal insulating cylinder through a heat resistant member.

11. A thermal insulating container according to claim 9, further comprising:

a gas flow passage which is provided between the inner container shell and the thermal insulator, and flows gas lower in temperature than the heat generation unit therethrough;

a thermal insulating cylinder having electrical insulating property, the thermal insulating cylinder being fitted to the first or second opening; and a cooling gas supply pipe which is fixed to the thermal insulating cylinder through a heat resistant member, and supplies the gas to the gas flow passage, wherein the pipe body is disposed in the cooling gas supply pipe coaxially therewith.

12. A thermal insulating container according to claim 1, further comprising: a protection layer which is provided on the heat generation unit side surface of the inner container shell, and prevents corrosion of the inner container shell.

13. A thermal insulating container according to claim 12, wherein the inner container shell is made of stainless steel, and the protection layer is made of chromium oxide.

* * * * *